Patented Aug. 16, 1927.

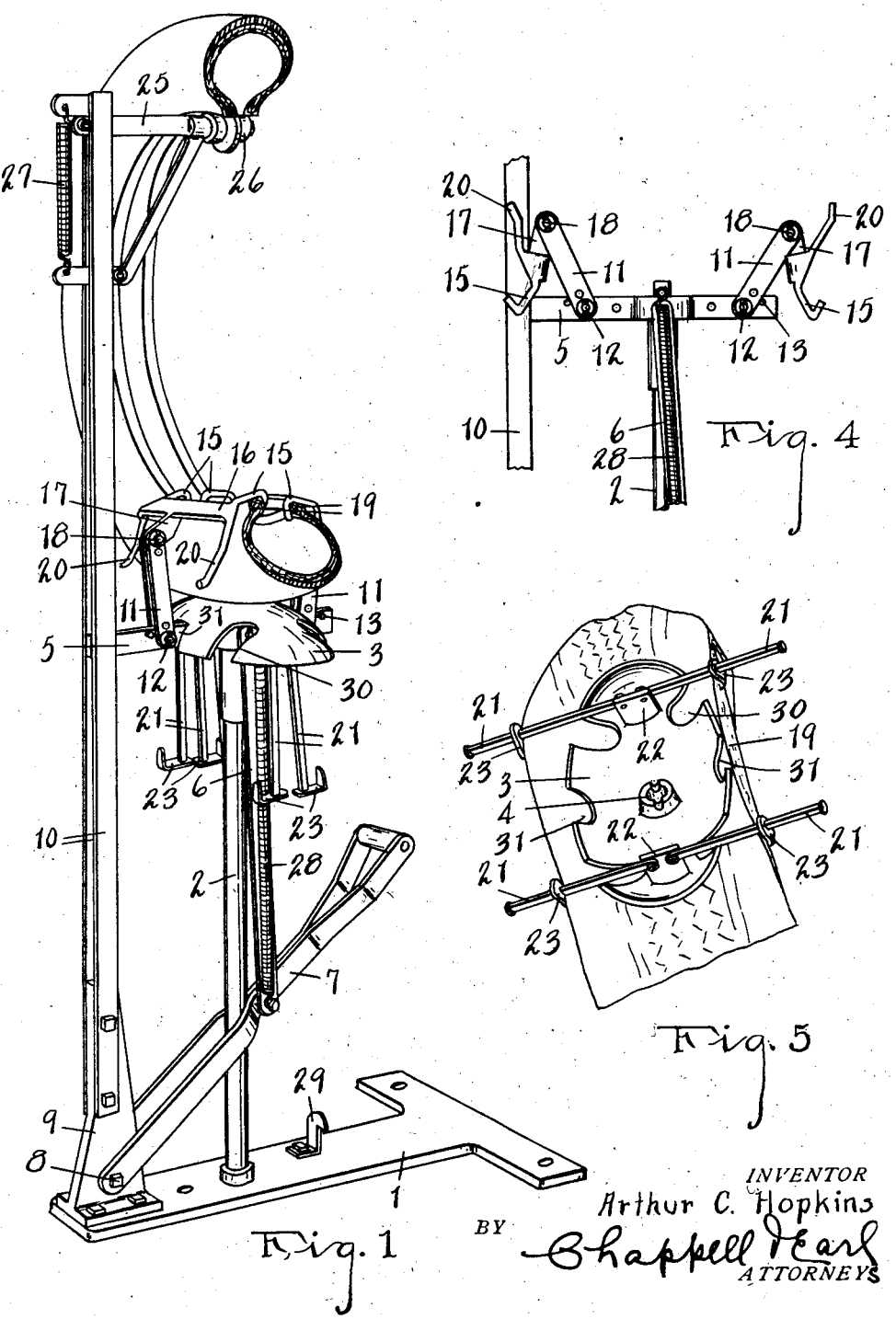

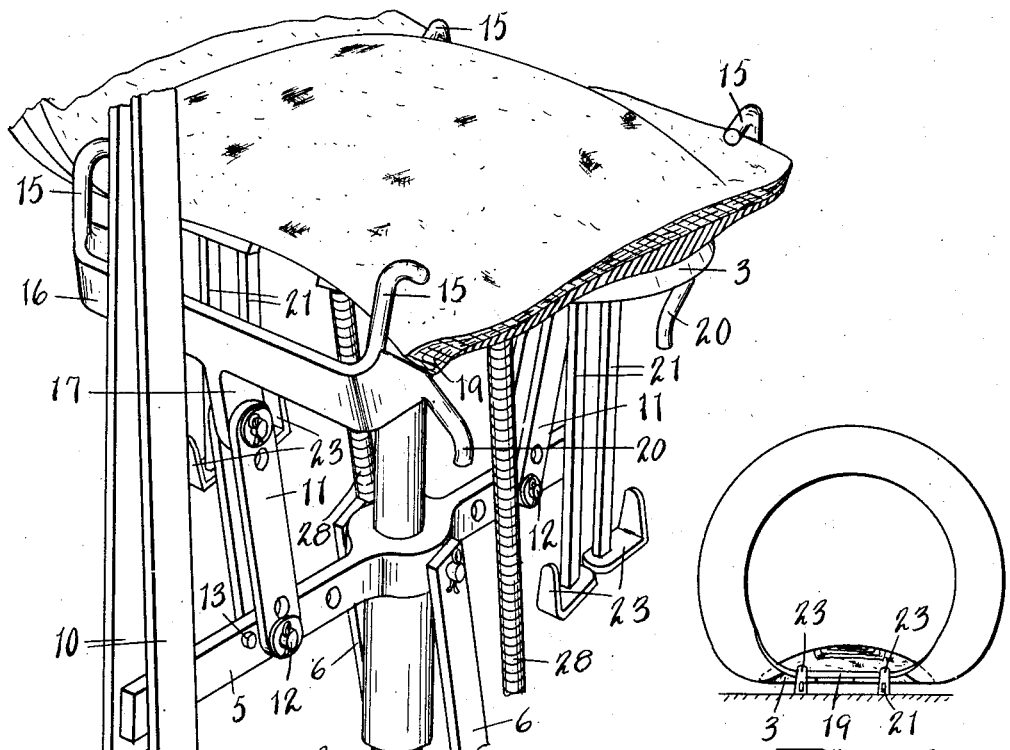
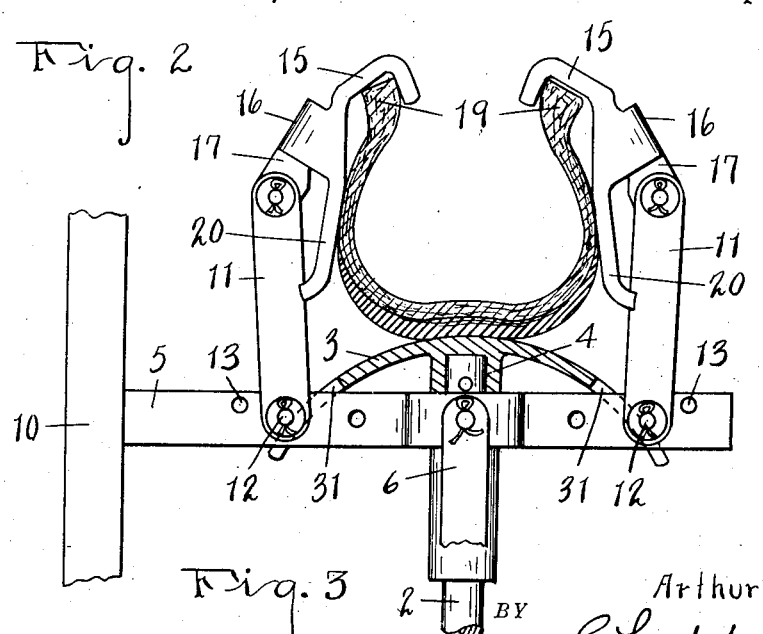

1,638,997

UNITED STATES PATENT OFFICE.

ARTHUR C. HOPKINS, OF NILES, MICHIGAN, ASSIGNOR TO NATIONAL STANDARD COMPANY, OF NILES, MICHIGAN.

TIRE SPREADER.

Application filed September 13, 1926. Serial No. 135,272.

The main objects of this invention are:

First, to provide an improved means for opening or spreading a tire which is not likely to injure or break the fabric thereof.

Second, to provide an improved means for securing a tire in its spread or open position upon a work holder facilitating repair upon the tire.

Third, to provide an improved tire spreader which is capable of rapid manipulation with a minimum of effort on the part of the operator.

Objects pertaining to details and economies of my invention will definitely appear from the detailed description to follow. The invention is clearly defined and pointed out in the claims.

A structure embodying the features of my invention is clearly illustrated in the accompanying drawing forming a part of this application, in which:

Fig. 1 is a perspective view of my improved tire spreader, a section of a tire casing being shown in adjusted position for the spreading operation.

Fig. 2 is a fragmentary perspective view with the tire in open or spread position.

Fig. 3 is a fragmentary section showing the relation of the spreading hooks to the tire when adjusted for the spreading operation.

Fig. 4 is a fragmentary elevation with the work holder removed.

Fig. 5 is an inverted view of the work holder with a fragment of the tire casing engaged thereby.

Fig. 6 is a side elevation of a tire spread and clamped upon the work holder.

Referring to the drawing, the base 1 is adapted to be mounted upon the floor, a bench or other support. This base carries a standard 2 for the work holder 3 which is a curved casting having a socket 4 in its under side to receive the upper end of the standard.

The standard slidably supports the crosshead 5 which is connected by the link 6 to the lever 7 pivoted at 8 on the base or footpiece 9 of an upright 10. This upright 10 is formed of two spaced pieces, the crosshead being disposed with one end between these upright pieces so that they serve as a guide therefor preventing rotation of the cross-head upon the standard.

Links 11 are pivoted upon the crosshead at 12, pins 13 limiting the outward swing of the links as shown in Fig. 4. These links carry tire engaging hooks 15 which are arranged in pairs connected by the bars 16 which have pivot ears 17 thereon connected to the links by pivots 18. The hooks 15 are adapted to engage the beads of a tire casing as 19 as shown in Fig. 3.

The hooks have downwardly projecting arms 20 which engage the side walls of a tire casing in spaced relation to the beads preventing buckling or sharp bending of the walls of the casing as the tire is pulled to open or spread position upon the holder. The holder 3 is provided with clamping arms 21 which are pivoted on the downwardly projecting lugs 22 on the under side of the holder, the clamping arms being provided with hooks 23 which are slidable on the arms to be moved inwardly into engagement with the edges of the tire, thereby retaining it in open position on the holder permitting the holder to be removed from the standard and the tire carried to position for other operations. By providing a number of the holders the spreader may be used to open another casing while other operations are being performed on a previously opened or spread tire.

To support the tire during the opening or spreading operation, I mount an arm 25 on the upright 10, the arm being vertically slidable on the upright and carrying a flanged roller 26 by means of which the tire may be rotated above the holder to the proper position for spreading or opening and for the purpose of inspection. A coiled spring 27 yieldingly supports the tire so that it may yield as the tire is pulled down by the spreading operation.

The actuating lever 7 is returned to its releasing position by means of the coiled spring 28, a keeper 29 being provided on the base with which the lever may be engaged for holding the crosshead in its lowered or actuated position. The work holder is, in the embodiment illustrated, slotted at 30 to receive the arms 21 and at 31 to receive the crosshead.

Having thus described my invention what I claim as new and desire to secure by Letters Patent is:

1. In a structure of the class described, the combination of a standard, a crosshead slidable on said standard, a downwardly curved work holder removably mounted on said standard above said crosshead, tire engaging hooks adapted to engage the bead of a tire resting upon said work support and provided with downwardly projecting arms adapted to engage and support the sides of a tire in spaced relation to the beads thereof, links connecting said hooks to said crosshead, pairs of arms pivoted on the under side of said work holder, said work holder being slotted to receive said arms, said arms having hooks slidably mounted thereon to engage a tire when opened upon said holder, an upright disposed at the side of said standard, said crosshead being slidably engaged with said upright, an arm slidably mounted on said upright and provided with a tire supporting roller overhanging said standard, a spring yieldingly supporting said arm, and means for actuating said crosshead.

2. In a structure of the class described, the combination of a standard, a crosshead slidable on said standard, a downwardly curved work holder removably mounted on said standard above said crosshead, tire engaging hooks adapted to engage the bead of a tire resting upon said work support and provided with downwardly projecting arms adapted to engage and support the sides of a tire in spaced relation to the beads thereof, links connecting said hooks to said crosshead, pairs of arms pivoted on the under side of said work holder, said work holder being slotted to receive said arms, said arms having hooks slidably mounted thereon to engage a tire when opened upon said holder, and means for actuating said crosshead.

3. In a structure of the class described, the combination of a standard, a crosshead slidable on said standard, a work holder on said standard above said crosshead, tire engaging hooks adapted to engage the bead of a tire resting upon said work support and provided with downwardly projecting arms adapted to engage and support the sides of a tire in spaced relation to the beads thereof, links connecting said hooks to said crosshead, an upright disposed at the side of said standard, said crosshead being slidably engaged with said upright, an arm slidably mounted on said upright and provided with a tire supporting roller overhanging said standard, a spring yieldingly supporting said arm, and means for actuating said crosshead.

4. In a structure of the class described, the combination of a standard, a crosshead slidable on said standard, a work holder on said standard above said crosshead, tire engaging hooks adapted to engage the bead of a tire resting upon said work support and provided with downwardly projecting arms adapted to engage and support the sides of a tire in spaced relation to the beads thereof, and links connecting said hooks to said crosshead.

5. In a structure of the class described, the combination of a standard, a crosshead slidable on said standard, a downwardly curved work holder removably mounted on said standard above said crosshead, links connecting said hooks to said crosshead, pairs of arms pivoted on the under side of said work holder, said work holder being slotted to receive said arms, said arms having hooks slidably mounted thereon to engage a tire when opened upon said holder, an upright disposed at the side of said standard, an arm slidably mounted on said upright and provided with a tire supporting roller overhanging said standard, a spring yieldingly supporting said arm, and means for actuating said crosshead.

6. In a structure of the class described, the combination of a standard, a crosshead slidable on said standard, a downwardly curved work holder removably mounted on said standard above said crosshead, tire engaging hooks, links connecting said hooks to said crosshead, pairs of arms pivoted on the under side of said work holder, said work holder being slotted to receive said arms, said arms having hooks slidably mounted thereon to engage a tire when opened upon said holder.

7. In a structure of the class described, the combination of a work holder, a crosshead vertically slidable below said work holder, links pivotally mounted on said crosshead, spaced pairs of tire engaging hooks pivotally mounted on said links and provided with downwardly projecting arms adapted to engage the sides of a tire in spaced relation to the beads thereof, and a supporting arm overhanging said standard and provided with a flanged tire supporting roller.

8. In a structure of the class described, the combination of a work holder, a crosshead vertically slidable below said work holder, links pivotally mounted on said crosshead, and spaced pairs of tire engaging hooks pivotally mounted on said links and provided with downwardly projecting arms adapted to engage the sides of a tire in spaced relation to the beads thereof.

9. In a structure of the class described, the combination of a support, a work holder removably mounted on said support, a crosshead slidably mounted on said support below said work holder, tire engaging members carried by said crosshead, means for actuating said crosshead to open the tire, and pairs of arms pivoted on the under side of said work holder, said arms having hooks slidably mounted thereon to engage a tire and retain the same in open position on said work holder.

10. In a structure of the class described, the combination of a work holder, a crosshead, links pivotally mounted on said crosshead, tire engaging hooks pivotally mounted on said link and provided with downwardly projecting arms adapted to engage the sides of a tire in spaced relation to the beads thereof, and a supporting arm overhanging said standard and provided with a flanged tire supporting roller.

11. In a structure of the class described, the combination of a support, a work holder removably mounted on said support, a tire spreading means, and arms pivoted on said work holder so that they may be swung to various angular relations relative to said holder, said arms having hooks slidably mounted thereon to engage a tire and retain the same in open position on said work holder.

12. In a structure of the class described, the combination of a work holder, a crosshead slidably mounted below said work holder, pairs of spaced tire engaging hooks adapted to engage the bead of a tire and provided with downwardly projecting arms adapted to engage the side walls of a tire in spaced relation to the tire beads, and links connecting said pairs of hooks to said crosshead.

13. In a structure of the class described, the combination of a work holder, tire engaging hooks adapted to engage the bead of a tire and provided with downwardly projecting arms adapted to engage the side walls of a tire in spaced relation to the tire beads, and means for actuating said hooks.

In witness whereof I have hereunto set my hand.

ARTHUR C. HOPKINS.